United States Patent Office 3,393,219
Patented July 16, 1968

3,393,219
PROCESS FOR PRODUCING ETHOXY AND
SULFATE SURFACE-ACTIVE AGENTS
Richard C. Myerly, Charleston, and James M. Rector, Edmund C. Steinle, Jr., and Harry T. Zika, South Charleston, W. Va., assignors to Union Carbide Corporation, a corporation of New York
No Drawing. Filed Jan. 27, 1965, Ser. No. 428,562
2 Claims. (Cl. 260—458)

ABSTRACT OF THE DISCLOSURE

An ether of ethylene or polyethylene glycol and an aliphatic alcohol is water washed prior to converting the ether to a nonionic detergent or an anionic detergent by further reaction with ethylene oxide or a sulfation agent such as chlorosulfonic acid. The water wash is conducted at elevated temperatures to take advantage of the inverse solubility of the ethers in order to precipitate them from water soluble polyethylene glycol also obtained in the manufacture of the ethers. Removal of the polyethylene glycol at this stage of manufacture of the surface active compounds obviates difficulties encountered when the polyethylene glycol is ethoxylated as in the case of nonionic surfactants or sulfated as in the case of cationic surfactants. Specifically the foam stability of the anionics is controlled and the room temperature solids of the nonionics reduced or substantially eliminated.

---

This invention relates to an improved method for producing surface-active agents from alcohols. More particularly, this invention is concerned with an improvement in the process for producing surface-active agents comprising reacting an alcohol with ethylene oxide to produce a monoalkyl ether of a poly(oxyethylene)glycol as an intermediate followed by conversion of the intermediate to an anionic or nonionic surface-active agent.

It is known that monohydric saturated aliphatic alcohols, or "alkanols," of from 10 to 20 carbon atoms can be reacted with from 0.2 to about 4 moles ethylene oxide per mole of alkanol in the presence of an acidic catalyst to produce a monoalkyl ether of a poly(oxyethylene)glycol. It is further known that this monoether can be reacted with additional ethylene oxide in contact with a basic catalyst to produce a nonionic surfactant, or can be sulfated and the resulting product neutralized to produce an anionic surfactant.

It is an object of this invention to improve the properties of the products of the aforementioned process.

It is a further object of this invention to improve the efficiency of the second ethoxylation or sulfation step of the aforementioned process.

These and other objects are accomplished by washing the reaction product of the first or acid-catalyzed ethoxylation step with an aqueous medium prior to conversion of the monoalkyl ether of poly(oxyethylene) glycol to a surface-active agent. The purpose of this water wash is to remove polyethylene glycols produced in the first step. These polyethylene glycols, if retained in the reaction product from the first step, result in a reduced efficiency in the second step because they compete with an alcohol-ethylene oxide adducts for the ethylene oxide or sulfation agent employed in the second step. In addition, the presence of polyethylene glycols or their sulfation products in the surfactant product adversely affects the properties of the product. For example, small amounts of polyglycols or their sulfates in an anionic detergent considerably reduce the foam stability of the detergent, and small amounts of polyglycols in a normally-liquid nonionic surfactant can result in an undesirable solid material which, if present in sufficient amounts, can cause the product to be in the form of a slurry or even a waxy solid.

The water wash of the process of this invention takes advantage of the "inverse solubility" of monoalkyl ethers of poly(oxyethylene)glycols in water with increasing temperature. These monoethers are slightly water-soluble at room temperature but, at some elevated temperature, known as the "cloud point," become essentially completely insoluble. Polyglycols, however, are water soluble at all temperatures up to about 100° C. or higher. Thus, by contacting the initial ethoxylation reaction product with water at a temperature above the cloud point of the reaction product but below the boiling point of water, one is able to readily extract the polyglycol from the monoalkyl ether of the poly(oxyethylene)glycol without substantial loss of monoether.

The use of an aqueous extraction technique for the determination of polyglycol content of nonionic surfactants has been reported by J. D. Malkemus et al., J. Am. Oil Chemists Soc., 34, pp. 342–4 (1957), and M. E. Ginn et al., Anal. Chem., 33, pp. 143–5 (1961). Conducting the extraction on the final surfactant is undesirable, however, for effecting a commercially-acceptable purification. First, as the proportion of ethyleneoxy ($-CH_2CH_2O-$) units in the polyglycol monoether increases, the water solubility of the ether increases and, therefore, the cloud point increases. Thus, when employing water alone as the wash medium for nonionic surfactants containing an average of 5 or more ethyleneoxy units, it is necessary to employ elevated pressures to maintain the water in the liquid phase at the elevated temperatures necessary to effect removal of the polyglycol without excessive loss of surfactant through dissolution in the water. Although the presence of salt in the wash water effects a reduction in cloud point, thereby permitting the use of temperatures of 100° C. or below for the extraction, the washed surfactant will retain the salt. This salt, which will adversely affect the properties of the surfactant, can be removed only by an additional water washing step which, like the use of elevated pressures, adds to the expense of the process.

Thus, the process of this invention comprises essentially the steps of (1) reacting an alkanol with ethylene oxide in contact with an acid catalyst to produce monoalkyl ether of a poly(oxyethylene)glycol, (2) washing the product of the first step with a medium consisting essentially of water to remove polyglycols formed in step (1) and, (3) conversion of the water-washed product to a surfactant.

As indicated above, the water wash is effected at a temperature above the cloud point of the polyglycol monoether. Temperatures of at least 10° C. above the cloud point are preferred to ensure that the solubility of the monoether in the wash water is sufficiently low to prevent excessive loss of monoether.

The amount of water employed is not highly critical to the process of this invention, and suitable amounts can be readily determined by a few simple experiments. In general, it has been found that a volume of water equal to about 0.25 to about 4 volumes per volume of monoether is effective.

The resulting two phase system is maintained at the selected elevated temperature, with agitation to ensure good contact of the phases, for a period of time sufficient to permit dissolution of the polyethylene glycol, generally from about 2 to about 10 minutes, and preferably from about 5 to about 7 minutes. The two phases are allowed to settle and the aqueous layer is removed. The washing can be repeated as many times as desired, but 2 to 3 washings are generally sufficient to remove essentially all of the polyethylene glycol present.

The water-washed intermediate is then preferably distilled to remove residual water which would interfere with the subsequent reaction with ethylene oxide or sulfation agent. The water content should be reduced to no more than about 0.1 weight percent.

The monoether intermediate which is washed in accordance with this invention is produced by the reaction of an alkanol of from 10 to 20 carbon atoms with ethylene oxide in contact with an acidic catalyst until from about 0.2 to about 6 moles of ethylene oxide have reacted per mole of alkanol charged.

The alkanol can be a primary, secondary or tertiary alkanol having a branched or straight chain alkyl group, although the washing is particularly effective when employed in conjunction with monoethers of secondary straight-chain alkanols. Single alkanols can be employed, if desired, although mixtures of several alkanols are generally employed in commercial practice.

Acidic catalysts which are employed in this reaction include the Friedel-Crafts type reaction catalysts, such as the fluorides and chlorides of boron, aluminum, iron, tin and titanium and complexes of such halides with ethers such as diethyl ether, with a boron trifluoride-diethyl ether complex being preferred. Other acidic catalysts which can be employed include sulfuric acid and phosphoric acid. The amount of catalyst is not highly critical, and is usually in the range of from about 0.1 to about 0.5 weight percent or higher, and preferably of from about 0.02 to about 0.5 weight percent, based upon the weight of alkanol charged.

The reaction is generally effected by slowly feeding ethylene oxide over several hours to an agitated admixture of alkanol and catalyst, which is maintained at a temperature in the range of from about 0° C. to about 80° C. and a pressure of from about atmospheric pressure to about 50 p.s.i.g. The reaction is continued until essentially all of the ethylene oxide has been reacted with the alkanol.

The resulting reaction mixture is neutralized to destroy the acidic catalyst, for example, with a 20 percent methanolic caustic soda solution, and thereafter fractionally distilled to recover unreacted alkanol as a distillate. The distillation residue comprises the polyglycol monoether intermediate, commonly having an average molecular weight in the range of from 200 to 400, the average composition of which may be represented by the formula:

(I) $RO(CH_2CH_2O)_xH$ wherein R is an alkyl radical having from about 10 to about 20 carbon atoms and $x$ is a number having a value, including fractional values, in the range of from about 1 to about 6.

Although the water wash may be effected subsequent to the distillation, it is preferably carried out before the distillation. In this way one can effect the simultaneous removal of water and unreacted alcohol from the polyglycol monoether.

A still more preferred technique is to effect the neutralization with aqueous base, thereby effecting the neutralization and at least a part of the washing in one step.

The distillation residue is then converted to a surfactant by the known techniques of either (1) reaction with additional ethylene oxide in contact with a basic catalyst to produce a nonionic surfactant, or (2) reaction with a sulfation agent followed by neutralization to produce an anionic surfactant.

The nonionic surfactant is generally produced by slowly adding ethylene oxide to an agitated admixture of the monoether of Formula I and a basic catalyst while maintaining the temperature in the range of from 80° C. to 200° C. to produce a product having an average composition corresponding to the formula:

(II) $RO(CH_2CH_2O)_yH$ wherein R is as defined above and $y$ is a number having a value, including fractional values, in the range of from about 4 to about 20, and is greater than $x$ in Formula I.

The basic catalyst employed in this second ethoxylation step is preferably an alkali metal alcoholate of a monohydric saturated aliphatic alcohol, and particularly an alkali metal alcoholate of the monoether recovered as the residue from the initial, acid-catalyzed step. The amount of alcoholate is not highly critical, and can vary from about 0.5 to about 75 mole percent of the monoether of polyethylene glycol, with an amount of about 2 mole percent being preferred.

The alkali metal alcoholate can be added to the distillation residue, if desired, but is preferably prepared in situ by reacting the residue with an alkali metal, caustic alkali or an alkali metal alcoholate of a lower alcohol, for example, methanol, at elevated temperatures, generally in the range of from 80° C. to 200° C. The reaction is desirably conducted in an atmosphere of nitrogen, with the hydrogen, water or low molecular weight alkanol product of the reaction being removed as formed until substantially all of the caustic alkali, alkali metal or the equivalent has reacted.

The product of the base-catalyzed reaction can be employed directly in the formulation of surfactant formulations, or it can be purified by conventional procedures, such as neutralization of the catalyst and then filtration and the like, if desired. Unexpectedly and surprisingly, however, little or no polyglycol is formed in this second ethoxylation step, thereby providing a nonionic monoalkyl ether of a polyethylene glycol surfactant which is substantially free of polyethylene glycols.

The second method for converting the water-washed ethers of Formula I to surfactants is via the well-known sulfation reaction, wherein the glycol monoether is converted ultimately to a salt of a monoalkyl glycol sulfate of the formula:

(III) $[RO(CH_2CH_2O)_xSO_3]^-M^+$ wherein R and $x$ are as defined above and M is at least one monovalent cation, such as an alkali metal, for example, sodium, potassium or lithium; the ammonium ion or its derivatives such as the tetramethylammonium, mono(hydroxyethyl)ammonium, di(hydroxyethyl)ammonium or tri(hydroxyethyl)ammonium ions. Alkali metal cations are preferred, with ammonuim and sodium being particularly preferred.

Sulfation agents which can be employed include sulfuric acid, oleum, chlorosulfonic acid, sulfamic acid, sulfur trioxide, either alone or as a complex with an amine, for example pyridine or an ether, acetylsulfuric acid and the like.

The particular conditions, i.e., temperature, pressure, solvents, etc., for effecting the sulfation with the known sulfation agents vary widely, depending upon the agent employed and, in view of their known nature, will not be further discussed. Again, depending upon the sulfation agent employed, special techniques must be employed to remove side products, such as water formed when sulfuric acid is employed or hydrogen chloride when chlorosulfonic acid is employed. The amount of sulfation agent employed should be in excess of the stoichiometric amount to ensure complete conversion of the monoether to sulfate. Normally a 2 to 15 percent excess is sufficient for this purpose, although when sulfuric acid is employed large excesses are necessary to take up the water of reaction.

The product of the sulfation reaction is generally an acid of the formula:

(IV) $RO(CH_2CH_2O)_xSO_3H$ wherein R and $x$ are as defined above. When sulfamic acid is employed as the sulfation agent, however, the ammonium salt of the acid is recovered directly from the reaction.

Because these products are generally acids, it is necessary to neutralize the reaction mixture to convert the acid to its salt. This neutralization is generally effected by reacting the acid with a base of the formula MOH, wherein M is as defined above. The base should be employed in a stoichiometric excess to ensure complete conversion of acid to salt and to neutralize any excess sulfation agent. The salt, after suitable purification techniques, can be employed in producing surfactant compositions, for example detergent compositions.

The following examples are illustrative. In these examples, the following analytical techniques and tests were employed:

(1) *Molecular weight of poly(oxyethylene)glycol monoether.*—An accurately weighed sample of monoether weighing approximately 4 grams is charged to a bottle containing 25 milliliters of a solution prepared by dissolving 42 grams of phthalic anhydride in 300 milliliters of pyridine. This bottle, together with a second containing only the phthalic anhydride reagent, is heated on a steam bath at 98±2° C. for two hours. After cooling to room temperature, the contents of each bottle are titrated with 0.5 N sodium hydroxide to a phenol phthalein end point. The molecular weight of the sample is then calculated from the equation $$MW = \frac{W \times 1000}{(B-A) \times 0.5}$$

wherein MW is the average molecular weight; W is the weight of the sample; B is the volume, in milliliters, of 0.5 N sodium hydroxide required for the blank; and A is the volume, in milliliters, of 0.5 N sodium hydroxide required for the sample.

(2) *Analysis for polyethylene glycol.*—An 8-μl. drop of a 10% solution of the ethoxylation reaction product in methanol is placed on a 0.4-mm. thick silica gel G plate, and then chromatographed with a 6:2:1 solution of ethyl ether, methanol and ammonium hydroxide. The alcohol ethoxylate follows the ascending solvent front while the polyethylene glycols follow at an $R_f$ value of about 0.74. The resulting chromatogram is sprayed with iodine followed by starch to make the spots visible. The polyethylene glycol content of the sample is estimated based upon the area and intensity of the spots as compared with spots obtained in a similar manner with polyethylene glycol alone.

(3) *Foam stability.*—A test formulation was prepared in a 1000-cc. flask, using water of the desired hardness, and warmed to 125±0.5° F. A 400-cc. sample of the formulation was added to a 2000-cc. beaker set on top of a Terg-O-Tometer table and the agitator, set at 75 r.p.m., was started. After 2 minutes of mixing time a 1 x 1¼-inch terry cloth swatch containing 0.3 ml. of Crisco shortening was added. An additional swatch was added every 15 seconds until all of the foam had disappeared. The test was repeated from 8 to 11 times for a given detergent sample and an average value computed. Generally, a change of one swatch represents a significant change in foam stability.

EXAMPLE 1

To a charge of 462 grams of a mixture of $C_{10}$–$C_{13}$ straight chain, secondary alkanols having an average molecular weight of 173 containing 0.075 weight percent of 48 weight percent boron trifluoride in ethyl ether was fed 255 grams of ethylene oxide, with stirring, over two hours. The reaction mixture was held at 60° C. and the maximum pressure was 10 p.s.i.g. during the addition. After an additional 0.5 hour at 60° C., the reaction product was neutralized with a 20 weight percent solution of sodium methylate in methanol. The resulting product was fractionated to remove unreacted alcohol. The residue comprised a crude mixture of polyethylene glycol monoethers containing polyethylene glycols and having an average molecular weight of 313.5.

In a similar manner, two additional samples of crude ethylene oxide adducts were prepared. The conditions and results of these runs are summarized in the table below, together with the data from the above-described run as Run 1.

| Run No. | 1 | 2 | 3 |
| --- | --- | --- | --- |
| Alcohol: | | | |
| Carbon Range | $C_{10}$–$C_{13}$ | $C_{12}$–$C_{13}$ | $C_{13}$–$C_{15}$ |
| Molecular Weight, Avg | 173 | 194 | 205 |
| Weight, gm | 462 | 284 | 1,150 |
| Ethylene Oxide, gm | 255 | 131 | 431 |
| Product, Molecular Weight, Avg | 313.5 | 331 | 332 |

The products of Runs 1–3 were then blended to provide a mixture containing 9.98 weight percent of the product of Run 1, 49.58 weight percent of the product of Run 2 and 40.44 weight percent of the product of Run 3. The blend had an average molecular weight of 330 and contained 2–3 weight percent polyethylene glycols.

One portion of the crude monoether blend was washed four times with water, with the weight of the wash water being 20 weight percent of the monoether. Each washing was effected by stirring the aqueous mixture at 95° C. for 10 minutes, allowing the mixture to settle for 30 minutes and separating the aqueous and organic phases. The washed product amounted to 96.4 weight percent of the crude blend, had an average molecular weight of 341 and contained no polyethylene glycol.

One portion of each of the crude and the water-washed monoether was sulfated by feeding 1.07 moles of chlorosulfonic acid per mole of monoether over 15 minutes to a stirred reaction vessel containing the monoether which was held at 24–28° C. After stirring for an additional 45 minutes in the case of the water-washed product and 75 minutes in the case of the unwashed product, during which time evolved hydrogen chloride gas was purged with a nitrogen stream, the sulfation product was neutralized with aqueous sodium hydroxide and ethanol was added to give a homogeneous solution.

Each of the sulfate solutions was evaluated for foam stability, employing as the test formulation a homogeneous solution of 29 weight percent sulfate of the polyethylene glycol monoether and 5 weight percent of the diethanolamide of lauric acid in aqueous ethanol. The formulations were tested at a concentration of 0.1 weight percent in water of 150 p.p.m. hardness.

The product produced in accordance with this invention washed 25 swatches before the foam disappeared, whereas the sulfate produced without the water wash washed only 22 swatches. The improvement of 3 swatches is clearly unexpected in view of the fact that the value to be expected, if proportional to the polyethylene glycol content of the ethoxylate precursor, would be less than 23 swatches. Thus, by prior removal of polyethylene glycol, the foam stability of the polyethylene glycol monoether sulfates was increased by over 300 percent of the expected increase.

EXAMPLE 2

To 1000 parts by weight of each of a washed and an unwashed intermediate ethoxylation product produced as described in Example 1, was added 2.5 parts by weight of pelleted potassium hydroxide. After drying to less than 0.035 percent water by heating at 80° C. and below 0.2 p.s.i.a. pressure, with stirring and in a nitrogen atmosphere for 30 minutes, each charge was heated to 110–5° C. and the nitrogen pressure was increased to 5 p.s.i.g. and approximately 820 parts by weight of ethylene oxide was added, with stirring, at 110–5° C. and 50–5 p.s.i.g. over 2.5 hours. After an additional one hour at the reaction temperature the reaction mixture was cooled to 60° C., neutralized with 85 percent phosphoric acid, heated at 80° C. at less than 0.2 p.s.i.a. for 30 minutes and filtered at 60–70° C.

The product obtained with the intermediate water wash of this invention was liquid at temperatures as low as 10–15° C., had a cloud point of 60.2° C. and an average molecular weight of 605, and contained less than 1 weight percent polyethylene glycol. The product obtained without the water wash of this invention was a solid melting at 30° C., had a cloud point of 59.9° C. and an average molecular weight of 586 and contained about 8 weight percent polyethylene glycols.

What is claimed is:

1. In a process for producing a surfactant having an average composition represented by the formula:

$$RO(CH_2CH_2O)_yH$$

wherein R is an alkyl group of from 10 to 20 carbon atoms and $y$ is a number having a value of from about 4 to about 20, which comprises the steps of (1) reacting an alkanol containing from 10 to 20 carbon atoms with from 0.2 to 6.0 moles of ethylene oxide per mole of alkanol in contact with an acidic catalyst to produce a monoalkylether of a poly(oxyethylene)glycol surfactant intermediate, and (2) thereafter reacting said intermediate with ethylene oxide in contact with a basic catalyst of the formula:

$$RO(CH_2CH_2O)_xH$$

wherein $x$ has a value of from about 1 to about 6 and R is as defined above, the improvement of increasing the efficiency in step 2 by the step subsequent to step (1) and prior to step (2) washing said intermediate with water at a temperature which is at least 10° C. greater than the cloud point of said intermediate and below 100° C., said water being employed in an amount which is from 0.25 to 4 volumes per volume of said intermediate.

2. In a process for producing a surfactant having an average composition represented by the formula:

$$[RO(CH_2CH_2O)_xSO_3]^-M^+$$

wherein R is an alkyl group of from 10 to 20 carbon atoms; $x$ is a number having a value of from about 1 to about 6; and M is at least one monovalent cation, comprising the steps of (1) reacting an alkanol containing from 10 to 20 carbon atoms with from 0.2 to 6.0 moles of ethylene oxide per mole of alkanol in contact with an acidic catalyst to produce a monoalkylether of a poly(oxyethylene)glycol surfactant intermediate of the formula:

$$RO(CH_2CH_2O)_xH$$

where said "$x$" has a value from about 1 to about 6 and R is as defined above, and (2) thereafter reacting said intermediate with a sulfation agent and neutralizing the product, the improvement of increasing the efficiency in step 2 and increasing the foam stability of the surfactant obtained by the step of subsequent to step (1) and prior to step (2) washing said intermediate with water at a temperature which is at least 10° C. greater than the cloud point of said intermediate and below 100° C., said water being employed in an amount which is from 0.25 to 4 volumes per volume of said intermediate.

References Cited

UNITED STATES PATENTS 2,662,881   12/1953   Batdorf _____ 260—616 X

OTHER REFERENCES

Surface-Active Agents and Detergents, vol. II, 1958, Schwartz et al., p. 122.

American Oil Chem. Soc. Journ., vol. 34 (1957), pp. 342–344, Malkemus et al.

CHARLES B. PARKER, *Primary Examiner.*

B. BILLIAN, L. C. MARUZO, *Assistant Examiners.*

UNITED STATES PATENT OFFICE
CERTIFICATE OF CORRECTION

Patent No. 3,393,219                       July 16, 1968

Richard C. Myerly et al.

It is certified that error appears in the above identified patent and that said Letters Patent are hereby corrected as shown below:

Column 7, lines 25 to 28, cancel "$RO\!-\!(CH_2CH_2O)_x\!-\!H$ wherein x has a value of from about 1 to about 6 and R is as defined above" and insert the same after "intermediate" in line 24, same column 7.

Signed and sealed this 17th day of March 1970.

(SEAL)
Attest:

Edward M. Fletcher, Jr.                    WILLIAM E. SCHUYLER, JR.
Attesting Officer                            Commissioner of Patents